US012700737B2

(12) United States Patent
Mendanha Pereira et al.

(10) Patent No.: US 12,700,737 B2
(45) Date of Patent: Aug. 4, 2026

(54) HYBRID POWER PLANT FAST FREQUENCY RESPONSE

(71) Applicant: VESTAS WIND SYSTEMS A/S, Aarhus N. (DK)

(72) Inventors: Ricardo Mendanha Pereira, Fânzeres (PT); Ricardo Manuel Teixeira Gomes, Oporto (PT)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 882 days.

(21) Appl. No.: 18/009,884

(22) PCT Filed: Jun. 3, 2021

(86) PCT No.: PCT/DK2021/050175
§ 371 (c)(1),
(2) Date: Dec. 12, 2022

(87) PCT Pub. No.: WO2021/249603
PCT Pub. Date: Dec. 16, 2021

(65) Prior Publication Data
US 2023/0223760 A1    Jul. 13, 2023

(30) Foreign Application Priority Data
Jun. 12, 2020    (DK) ........................... PA 2020 70379

(51) Int. Cl.
*H02J 3/38*        (2026.01)
*H02J 101/24*    (2026.01)
*H02J 101/28*    (2026.01)

(52) U.S. Cl.
CPC ............. *H02J 3/38* (2013.01); *H02J 2101/24* (2026.01); *H02J 2101/28* (2026.01)

(58) Field of Classification Search
CPC ....................................................... H02J 3/38
See application file for complete search history.

(56) References Cited

U.S. PATENT DOCUMENTS 10,975,847 B1 *    4/2021    Schulten ................. H02J 3/241
2012/0061959 A1    3/2012    Yasugi et al.
(Continued)

FOREIGN PATENT DOCUMENTS

CN        103748757 A        4/2014
EP            3343718 A1        7/2018
(Continued)

OTHER PUBLICATIONS

International Search Report and Written Opinion for PCT Application No. PCT/DK2021/050175, dated Sep. 2, 2021.
(Continued)

*Primary Examiner* — Nathan L Laughlin
(74) *Attorney, Agent, or Firm* — Patterson + Sheridan, LLP; Gero G. McClellan

(57) ABSTRACT

Aspects of the present invention relate to a method of controlling a hybrid power plant connected to a power network. The hybrid power plant comprises at least two types of renewable energy generator having an active power reserve for supplying additional active power. The method comprises, during a frequency event detected on the power network: determining an additional amount of active power to be provided to the power network to provide fast frequency response; calculating, based on a preset configuration and the active power reserve of the generators, a contribution from each of the at least two types of generator for supplying the additional amount of active power; and generating and dispatching active power requests to the generators for supplying the additional amount according to the calculated contributions.

11 Claims, 6 Drawing Sheets

(56)         References Cited

U.S. PATENT DOCUMENTS

| | | | |
|---|---|---|---|
| 2012/0323396 A1 | 12/2012 | Shelton et al. | |
| 2014/0142776 A1 | 5/2014 | Nielsen et al. | |
| 2017/0110882 A1 | 4/2017 | Shelton et al. | |
| 2018/0191160 A1 | 7/2018 | Carr et al. | |
| 2020/0021236 A1* | 1/2020 | Pan | H02J 7/35 |
| 2021/0151988 A1* | 5/2021 | Milivojevic | H02J 3/32 |
| 2022/0255323 A1* | 8/2022 | Mendizabal Abasolo | |
| | | | G06Q 10/06315 |
| 2022/0307474 A1* | 9/2022 | Bao | H02J 3/381 |

FOREIGN PATENT DOCUMENTS

| | | | |
|---|---|---|---|
| WO | 2019120396 A1 | 6/2019 | |
| WO | 2020057702 A1 | 3/2020 | |

OTHER PUBLICATIONS

Danish Patent Office, Search Opinion for Denmark Patent Application No. PA 2020 70379, dated Dec. 3, 2020.
Danish Patent Office, Search Report for Denmark Patent Application No. PA 2020 70379, dated Dec. 3, 2020.
Office Action received for Chinese Patent Application No. 202180042162.X, mailed on Jan. 16, 2026, 15 pages (8 pages of English Translation and 7 pages of Original Document only).

* cited by examiner

HYBRID POWER PLANT FAST FREQUENCY RESPONSE

TECHNICAL FIELD

The present disclosure relates to a method of controlling a hybrid power plant. Aspects of the invention relate to a hybrid power plant controller, and to a hybrid power plant.

BACKGROUND

Regulators and operators of power networks expect connected power plants to adhere to a 'grid code' and to provide particular ancillary services to the power network.

For example, some operators require power plants to support the power network when the frequency of the power network deviates from the normal operational range. A range of control strategies have been developed for wind power plants to provide a 'fast frequency response'. During these under- or over-frequency events when fast frequency response is provided, active power is increased or decreased respectively to counteract the frequency deviation.

However, these control strategies are suitable only for wind turbine generators. The increasing penetration of hybrid power plants, combining different types of renewable energy generator, calls for new control strategies that make use of and are suitable for all types of generator within the power plants and not just the wind turbine generators.

It is an aim of the present invention to address this need.

SUMMARY OF THE INVENTION

According to an aspect of the present invention there is provided a method of controlling a hybrid power plant connected to a power network. The hybrid power plant comprises at least two types of renewable energy generator having an active power reserve for supplying additional active power to the power network. The method comprises, during a frequency event detected on the power network: determining an additional amount of active power to be provided by the hybrid power plant to the power network to provide fast frequency response; calculating, based on a preset configuration and the active power reserve of the generators, a contribution from each of the at least two types of generator for supplying the additional amount of active power; and generating and dispatching active power requests to the generators for supplying the additional amount according to the calculated contributions.

The frequency event may comprise an under-frequency event. During an under-frequency event, the frequency level of the power network drops below a nominal frequency of the network.

By controlling types of generator according to a preset configuration, power plants can be controlled in a much more dynamic way. While many of the benefits depend upon the control strategy and intentions of the operator, the use of a preset configuration has general benefits of improving efficiency in the use of the available resources and reserve capacity during frequency events. The dynamic control of the generators also ensures that the frequency response is responded adequately, while allowing a greater overview of how the plant is operating. The invention is particularly useful for hybrid power plants having a variety of different generator types, as the control can be varied in many different ways to quickly react to frequency events, to maintain frequency responses, and, in some circumstances, take part in auxiliary service markets that would ordinarily not be open to renewable power plants.

The preset configuration may comprise a percentage split of the additional amount between the at least two types of generators. Calculating the contribution may comprise applying the percentage split to the additional amount and apportioning the resulting values to the types of generator according to the percentage split.

The method may comprise comparing, for each type of generator, the calculated contribution with the available capacity of reserve of the generators. If the calculated contribution exceeds the available capacity, the method may comprise adjusting the percentage split to account for the exceedance.

Where at least one type of generator is configured to contribute active power from a reserve and using an over-boost mechanism, the percentage split may include a percentage for the reserve and a percentage for the over-boost.

The preset configuration may comprise a sequence in which the types of generator should cumulatively provide a maximum-possible contribution to the additional amount.

Calculating the contribution may comprise comparing, in the order of types of generator of the sequence, a remainder of the additional amount with the available capacity of reserve of the generators. If the remainder exceeds the available capacity of the generators, calculating the contribution may comprise setting the contribution to equal to the available capacity. If the available capacity exceeds the remainder, calculating the contribution may comprise setting the contribution to equal to the remainder.

Where at least one type of generator is configured to contribute active power from a reserve and using an over-boost mechanism, the sequence may include an entry for the reserve and an entry for the over-boost. The entry for the reserve may be earlier in the sequence than the entry for the over-boost.

The method optionally comprises, during a period of post-over-boost recovery during which the active power contribution of one type of generator drops below a nominal level, compensating for at least part of the drop using the reserve of a different type of generator. The reserve of the type of generators providing compensation may be reserved for compensation only. Alternatively, the reserve of the type of generators may be divided into reserve for use in providing contribution to the additional amount and reserve for compensation. The type of generators providing compensation may comprise battery energy storage.

Calculating the contribution may comprise comparing a demand ramp rate with a ramp rate limit for a type of generator in the sequence. If the demand ramp rate exceeds the ramp rate limit, calculating the contribution may comprise calculating a contribution from the next type of generator in the sequence to meet the demand ramp rate.

The hybrid power plant may comprise at least two types of generator selected from the list comprising: wind turbine generators; a battery energy storage system; and/or photovoltaic generators.

The hybrid power plant may comprise wind turbine generators, a battery energy storage system, and photovoltaic generators. The wind turbine generators and photovoltaic generators may be positioned before the battery energy storage system in the sequence, where the preset configuration comprises a sequence.

A slave wind power may be is provided as a separate type of renewable energy generator to the wind turbine generators of the hybrid power plant.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
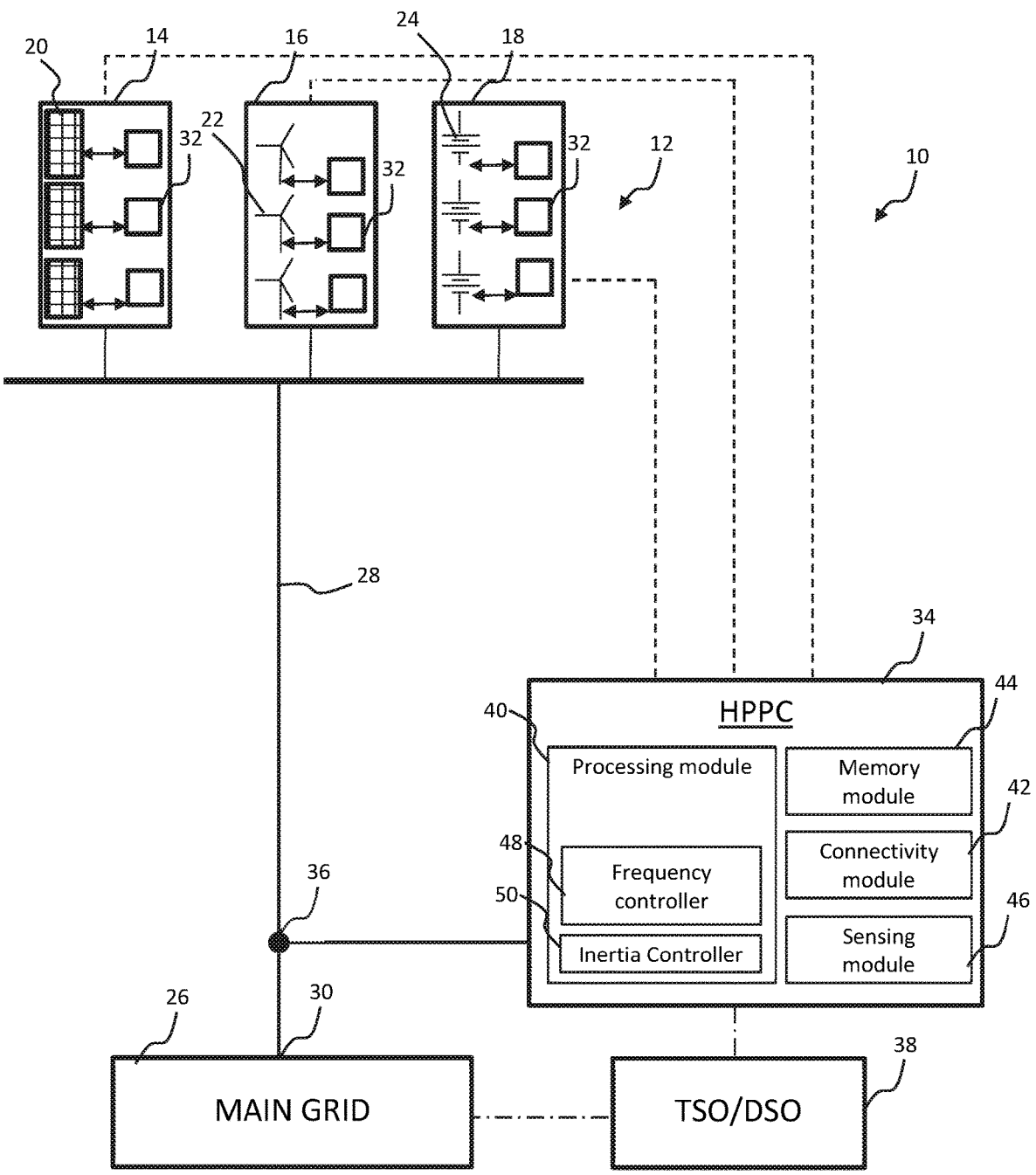
FIG. 1 is a schematic representation of a hybrid power plant, its connection to a power network, and its control system.

Generally, the present application relates to a method of controlling a hybrid power plant to supply additional active power during an under-frequency event, and to the configuration of a hybrid power plant controller to implement such a method. The method makes use of a configuration, which may also be thought of as a 'scheme', 'distribution', or 'control strategy', according to which the power generators of the plant are employed to provide the additional active power. In general, this configuration may comprise dividing, proportioning, or splitting the power that is supplied by different types of generator in response to a detected frequency event, and this may be achieved for example by the use of a percentage split between different types of generator, or a sequence indicating an order in which the reserve power provided by the different types of generator should be used. Such a method enables an efficient and complete fast frequency response from a hybrid power plant. Furthermore, the response is configurable so that the operator of the plant or the power plant controller can adjust how fast frequency response is provided. This flexibility ensures that an optimal provision of additional active power in response to a frequency drop can be achieved.

The term and concept of 'fast frequency response' (FFR) as used herein is defined as the fast correction of power imbalances that cause frequency deviations. National or international power networks typically have a nominal frequency, also referred to as the utility or mains frequency. Around the world, this nominal frequency is typically 50 Hz or 60 Hz. Changes in frequency are undesirable, as equipment to which power is supplied is configured to operate a particular frequency with a relatively tight tolerance. Thus, where frequency deviates from the nominal frequency, even by less than 1 Hz, it is important to correct the deviation quickly, typically within a few seconds of the deviation at most. Accordingly, a fast rectification and reinstatement of frequency to its nominal value is desirable in these situations, and this is provided by FFR. Grid regulations may penalise or disconnect plants that are seen to be de-stabilising the frequency and grid as a whole and/or not responding to deviations in frequency.

FFR encompasses inertia emulation and inertia emulated control. FFR is typically performed in short time-frames and is dependent upon specific grid regulations. Accordingly, frequency control during FFR is supplied according to predetermined curves and/or predetermined calculations relating to the amount of active power to inject to the grid to counteract particular changes in frequency. FFR should be distinguished from frequency control. Frequency control is the maintenance of frequency levels within a small dead-band around a nominal frequency and is the primary response of the system during normal operation. FFR is the response of the system in extraordinary circumstances, when a rate of change of frequency is greater than a threshold, or when the frequency deviates outside of the dead-band or from its nominal value beyond a threshold value. Accordingly, FFR depends on one or more triggers, as will be discussed in detail below.

The FFR is typically provided by an inertia controller, which operates alongside a frequency controller, both controllers being disposed within a hybrid power plant control system. The inertia controller is configured to determine one or more of the triggers, to determine additional amounts of active power to be requested from the power generators, and to dispatch requests for this active power accordingly as set points or references as appropriate.

To aid with the explanation of the provision of fast frequency response within a hybrid power plant, FIG. 1 illustrates a typical architecture in which a hybrid power plant (HPP) is connected to a main transmission grid as part of a wider power network. The HPP comprises three sub-plants: a battery energy storage system, a solar power sub-plant, and a wind power sub-plant. More generally, as will be understood by the skilled reader, a HPP is a power plant that comprises at least two different types of renewable energy generator.

Where 'types' of generator are discussed herein, a type of generator is generally defined in relation to its source of renewable energy so that different types of generator generate energy from different renewable energy sources. For example, wind turbine generators in a hybrid plant may be considered to be one type of generator because they generated energy from wind energy. Photovoltaic cells may be another type of generator, as these generators generate energy from a different source to wind energy, i.e. solar energy. Although battery energy storage systems do not generate renewable energy directly, the may be considered to be a further type of generator because they are able to supply energy gathered from renewable energy sources in a different way to wind and solar generators. In some embodiments, generators of other power plants may be considered to be a separate type as they generate form a differently located source of renewable energy, even if the type of the source is the same. In other words, two wind power sub-plants may be considered to be different types of generator due to being situated in different locations.

The examples shown in the figures are representative only and the skilled reader will appreciate that other specific architectures of HPPs are possible. For example, it is possible that more than three sub-plants may be incorporated into a HPP, or the HPP may comprise two sub-plants only. Furthermore, it will be understood by the skilled reader that a sub-plant forming the HPP may be formed by a single generator. Therefore, as a sub-plant may comprise a single generator and a hybrid power plant requires two or more sub-plants, a hybrid power plant may be defined as a power plant incorporating at least two renewable energy generators, in which the power generated by the power plant is generated from at least two different sources of renewable energy. While PV, wind, and battery power are discussed herein, it will also be appreciated that other forms of renewable energy generator may also be included in HPPs as appropriate, and that the concepts of reserves described below also apply to other types of generators.

In some embodiments described herein, a power plant external to the HPP is operated in a master-slave architecture. For the purposes of this application, and for ease of description, during the time period that a power plant is operated in this slave configuration it will be considered to be part of the HPP.

The skilled reader will appreciate that methods, systems and techniques also described below may be applicable to many different configurations of power network. Moreover, the components of the hybrid power plant and power network are conventional and as such would be familiar to the skilled reader. It is expected that other known components may be incorporated in addition to or as alternatives to the components shown and described in FIG. 1. Such changes would be within the capabilities of the skilled person.

Considering FIG. 1 in more detail, a power system 10 incorporates the HPP 12. The HPP 12 includes the three sub-plants: the solar power sub-plant 14, the wind power sub-plant 16, and the battery energy storage sub-plant 18. The solar sub-plant 14 comprises a plurality of photovoltaic (PV) generators 20, more commonly known as PV cells, configured to convert solar energy into electrical energy. The wind sub-plant 16 comprises a plurality of wind turbine generators (WTGs) 22 configured to convert wind energy into electrical energy. The battery sub-plant 18 comprises at a plurality of electrochemical battery units 24, lithium-ion storage units for example, operable to store and release electrical energy as required. Single WTGs 20, PV cells 22, or battery units 24 would also be possible in each of these sub-plants 14, 16, 18. The electrical energy generated or released by each sub-plant 14, 16, 18 is transferred to a main transmission network or main grid 26, as active current, for distribution.

As already discussed, fast frequency response is implemented by the provision of additional active power by the HPP 12 to the main grid 26. Each type of generator is capable of providing additional active power beyond its normal active power generation during fast frequency response in at least one way.

Considering wind power first, WTGs 22 are configured to incorporate a so-called 'spinning reserve'. The spinning reserve includes at least an extra amount of active power generation specifically designated as being for the purpose of fast frequency response. WTGs have a rated power or maximum power generation capability in normal operation, such as 3 MW for example, and the spinning reserve comprises a designated amount of this rated power. For example, a percentage of the rated power may be specifically designated and marked for use as spinning reserve. Therefore, this spinning reserve is not used during normal power generation, so that the maximum output of the WTG is a set amount below the rated power. For example, a wind turbine generator may have a nominal power of 3 MW, of which 10% is designated as being spinning reserve. So, 0.3 MW of the wind turbine generator's power capability is reserved for responding to under-frequency events, so that the maximum active power generation of that generator in normal circumstances is 2.7 MW.

The spinning reserve may include any further capacity of the WTGs that is not currently in use and therefore available for increasing generation. Of course, this assumes that the wind speed is high enough to sustain such an increase. Again using the example of a 3 MW rated WTG that has 10% spinning reserve, if the WTG is only outputting 1.5 MW instead of its maximum of 2.7 MW, then 1.5 MW is still available for use as spinning reserve.

WTGs are also capable of supplying active power above their rated value for short periods of time in the form of an 'over-boost' mechanism. Generally, an over-boost mechanism as used herein relates to power output by a generator that is above normal operational levels or normally-allowed operational levels, and that can only be sustained for a short period of time, in the order of a few seconds or minutes.

Using the over-boost mechanism, kinetic energy from the rotating components of the wind turbine generator, such as the rotor itself, are harnessed and re-purposed to provide a brief boost to the active power released. In other words, over-boost is the transformation of kinetic energy into electrical energy in the form of active power. As the kinetic energy of the rotating components is effectively drained when using the over-boost, there is typically a period of 'recovery' after the additional active power has been supplied, during which the lost kinetic energy is recovered and the active power output is therefore decreased to account for this regain of kinetic energy. The recovery period depends on wind speeds at the time of recovery. High wind speeds may make the length of the recovery period negligible due to the kinetic energy being able to be regained much more quickly.

As noted above, over-boost is only possible for a short amount of time otherwise the rotor loses too much kinetic energy to regain normal operation. Over-boost is typically available for periods up to 5 or 10 seconds for each generator, although where a plurality of generators are used, the period of over-boost is dependent upon the amount of additional active power requested and the number of turbines having over-boost capability. For example, a high active power injection may allow only 10 seconds of over-boost, whereas a lower injection of active power may permit an increase in the over-boost capability to longer times, such as 30 seconds or longer.

PV generators 20 are also able to provide a reserve of active power in the same way as described above for WTGs 22, which is functionally equivalent to spinning reserve. To do so, a portion of the active power production capability of the generators has to be set aside for use in providing such a reserve. In some circumstances, PV generators 20 or battery energy storage units 24 may also be configured to provide an over-boost where conditions allow. To briefly expand, PV generators and battery energy storage units may be configured to provide over-boost based on a current flow higher than the rated current of the converter for the relevant units.

Battery energy storage units 24 comprise stores of charge for supplying active power on demand, a portion of which may be designated as a reserve of active power for use in fast frequency response. In some embodiments, the entire capacity of the battery energy storage system may be for the purpose of fast frequency response—i.e. the battery system is wholly designed and provided for that purpose. In contrast to PV generators 20 and wind turbine generators 22, battery energy storage system 24$s$ are non-generating systems, and so the reserve is not an additional amount on top of generating power, but the amount of power stored within the stores. As the battery energy storage systems require some charge to be able to discharge active power, limits may be defined or specific amounts of charge may be set aside to be provide a reserve for certain situations. For example, maximum and minimum levels of the state of charge of the battery system may be defined for fast frequency response, frequency control other than fast frequency response, and for overall operation of the storage system (other than the absolute maximum, i.e. full charge, and minimum, i.e. wholly depleted).

Returning to FIG. 1, within each sub-plant 14, 16, 18, each of the generators 20, 22, 24 is connected to a local grid (not shown) that links the generators 20, 22, 24. The sub-plants 14, 16, 18 may also be joined to one another by a suitable inter-sub-plant grid (also not shown) or a collector bus. Via this grid or collector bus, the HPP 12 is connected to the main grid 26 (also called a main power network) via a connecting network 28. The HPP 12 and the main grid 26 are connected at a Point of Interconnection (PoI) 30, which is an interface between the HPP 12 and the main grid 26. It should be assumed that references to components being connected or connections between components comprise suitable feeder or transmission lines unless it is otherwise indicated.

Each of the generators 20, 22, 24 within the sub-plants 14, 16, 18 of FIG. 1 is associated with a respective generator controller, generally labelled 32. In some embodiments, a sub-set of generators 20, 22, 24, such as those within the wind power sub-plant 22, may share a single, semi-centralised controller, such that there are fewer generator controllers than generators. As would be apparent to the skilled person, generator controllers 32 can be considered to be computer systems capable of operating a PV cell 20, WTG 22 and/or battery unit 24 in the manner prescribed herein, and may comprise multiple modules that control individual components of each generator 20, 22, 24.

During operation of the HPP 12, the generator controllers 32 operate to implement active and reactive current requests received from a hybrid power plant controller (HPPC) 34 at their respective generator(s) 20, 22, 24. In some embodiments, the HPPC 34 may be connected directly to the generators 20, 22, 24 without an intermediary controller and may distribute set points accordingly.

The HPPC 34 is connected to the power network 10 at a Point of Measurement (PoM) 36 and is also connected directly to each of the sub-plants 14, 16, 18 of the HPP 12. The role of the HPPC 34 is to act as a command and control interface between the HPP 12 and the grid 26, and more specifically, between the sub-plants 14, 16, 18 and a grid operator or transmission system operator (TSO) 38. The HPPC 34 is a suitable computer system for carrying out the controls and commands as described above and so incorporates a processor 40, a connectivity module 42, a memory module 44, and a sensing module 46. The processor 40 incorporates a frequency controller 48 and an inertia controller 50. The inertia controller 50 conventionally acts to provide an inertia response based on a change in active power in dependence on frequency. The inertia controller 50 may also provide a frequency response based on a deviation of frequency, as discussed herein. The HPPC 34 may also receive information regarding the grid 26 and/or connecting network 28 from an energy management system (not shown) or by direct measurement.

The HPPC 34 is connected to the connecting network 28 to allow monitoring and regulation of the output of the HPP 12 and to interpret power demands correctly. The HPPC 34 measures a variety of parameters that are representative of the state of the grid 26 and HPP 12, and that can be used to improve the outputs of the HPP 12 to best meet the requirements of the TSO 38 or as set out in a set of grid-specific requirements.

In some embodiments the HPPC 34 may be configured to communicate with a power plant controller of a separate power plant (not shown) and to issue commands for the separate power plant to follow. In these embodiments, the HPPC 34 and separate power plant controller operate in a master-slave architecture.

As noted, the sub-plants 14, 16, 18 of the HPP 12 are capable of altering their power output in reaction to commands received from the HPPC 34 by virtue of specific controllers. It will be noted that FIG. 1 is a schematic view, so the way in which the control commands are transferred is not depicted explicitly. However, it will be appreciated that suitable cabling may be provided to interconnect the HPPC 34 and the sub-plants 14, 16, 18, generators 20, 22, 24 or generator controllers 32. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

As discussed above, the HPPC 34 manages the HPP 12 according to a set of grid requirements that are specific to the main grid 26. In this description, the focus is on the regulation of the frequency of the main grid and the provision of FFR by the HPP 12, as implemented by the HPPC 34.

During frequency deviations, a HPP 12 according to the embodiments described herein and operated by a HPPC 34 according to the methods described herein employs a fast frequency response to counteract frequency deviations. During under-frequency events or 'frequency drops', in which the frequency drops below its nominal level, the HPP 12 is configured to react by increasing its active power contribution to the grid to increase the frequency level. During over-frequency events, in which the frequency rises above its nominal level, the HPP 12 configured to react by reducing its active power output to the grid to reduce the frequency level.

The following description focusses on under-frequency events and the fast frequency response to these under-frequency events.

Figure 2:
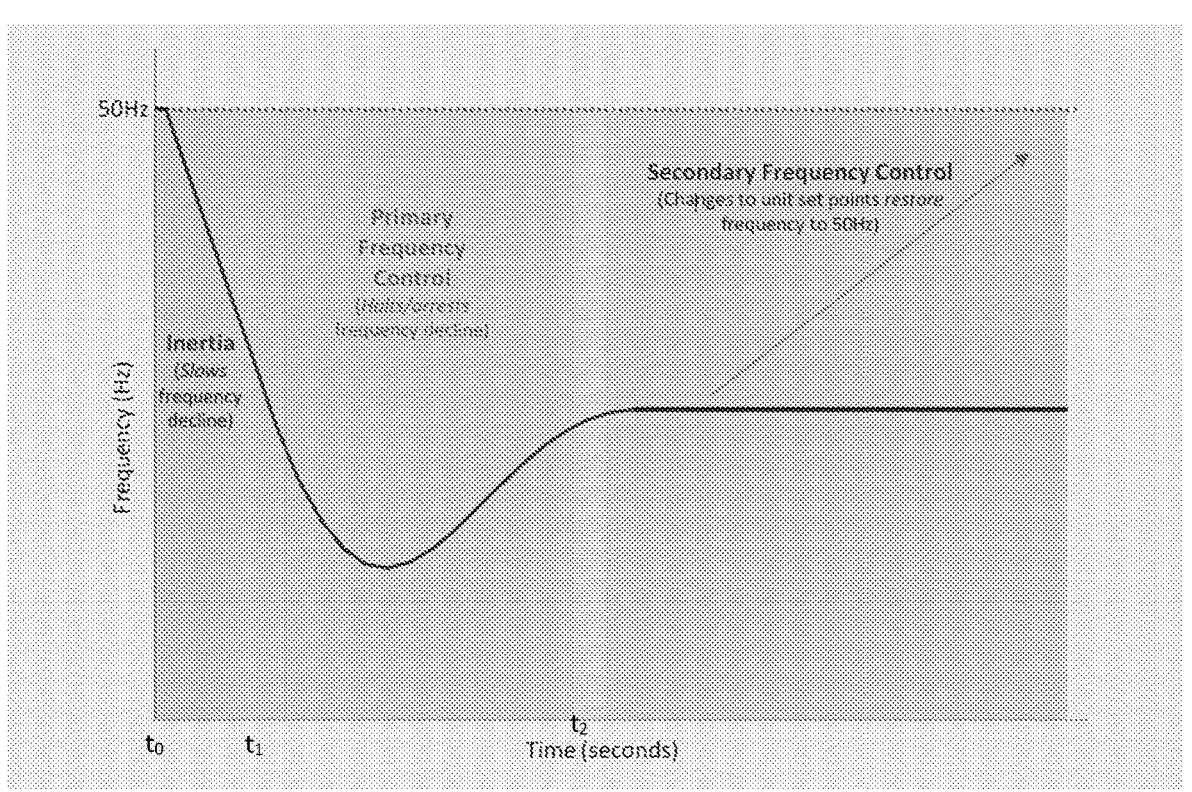
FIG. 2 is a chart indicating an exemplary frequency drop.

An example under-frequency event is shown in FIG. 2. The event can be split into three approximate periods. In the first period, between time $t_0$ and time $t_1$, the frequency begins to fall from its nominal frequency, which in this example is 50 Hz. Based on one or more trigger events, FFR is provided. During the first period, the so-called 'inertia' period, the FFR is ramping up and slows the decline in frequency. During the second period, between time $t_1$ and time $t_2$, the initial rate of change of frequency is reduced, slows to a frequency minimum, and begins to rise again. This second period is the period of 'primary frequency control', and is the period when the FFR is provided. Once the frequency level reaches a plateau that is within threshold values of the nominal frequency, the third period is entered, between times $t_2$ and $t_3$, during which 'secondary frequency control' is performed. Secondary frequency control is frequency control to restore the frequency to the nominal frequency using conventional frequency control, and so is not considered to be part of the FFR.

As noted above, there is a difference between frequency control during normal circumstances and FFR. FFR is initiated by one or more trigger events identified at the HPPC, specifically within the inertia controller. FFR triggers include fulfilment of criteria, including: a frequency error value exceeding a threshold, frequency dipping below a threshold, and a rate of change of frequency above a threshold value. FFR may terminate when one of the following criteria is fulfilled: an over-boost period ends; a period of time has elapsed since the initial trigger; the frequency error value is reduced to an acceptable level/the frequency rises back to the band around the nominal value.

In the example of FIG. 2, during the first time period the rate of change of frequency is high and the error value exceeds its threshold, so a trigger occurs and fast frequency response is initiated.

Figure 3:
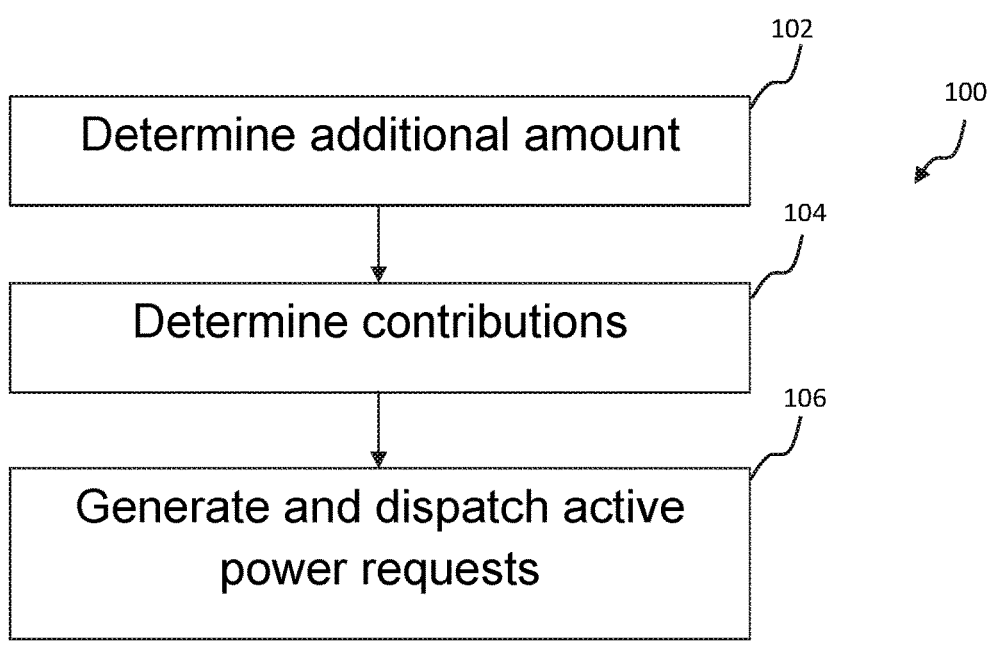
FIG. 3 is a method for operating the hybrid power plant of FIG. 1 according to an embodiment of the invention.

In response, the HPPC 34, and particularly the inertia controller 50, implements one or more control strategies and controls the generators of the HPP 12 accordingly. During the under-frequency event, the HPPC 34 is configured to implement the method 100 of FIG. 3. In a first step 102, an additional amount of active power to be provided by the HPP 12 to the main grid 26 to provide FFR is determined. Having determined the additional amount, at the next step 104 the HPPC 34 calculates a contribution from each type of generator. In the embodiment of FIG. 1, the types of generator are arranged into sub-plants, so the contribution from each sub-plant 14, 16, 18 is calculated. The contribution is for supplying the additional amount of active power to the main grid 26. The contribution is calculated based on a configuration or control strategy set within or by the HPPC 34. Based on the calculated contribution, at the next step 106 the HPPC 34 generates and dispatches requests for the additional amount of active power to either local controllers 32 or directly to the generators 20, 22, 24. In other words therefore, when FFR is active, i.e. after a trigger, the HPPC 34 is determines the extra active power needed to support recovery of the grid frequency and then commands generators 20, 22, 24 to supply that extra active power according to the configuration according to which the HPPC 34 is operating. The repetition of the method 100 to determine new contributions is performed at a predetermined frequency.

The configurations and control strategies are described below, with reference to FIGS. 4 to 10. FIGS. 4 to 10 are charts illustrating how the contribution from each type of generator is provided to fulfil the additional amount required for supporting the main grid. As each chart has an appropriate legend, additional labelling with reference signs will only be provided where necessary for clarity.

Figure 4:
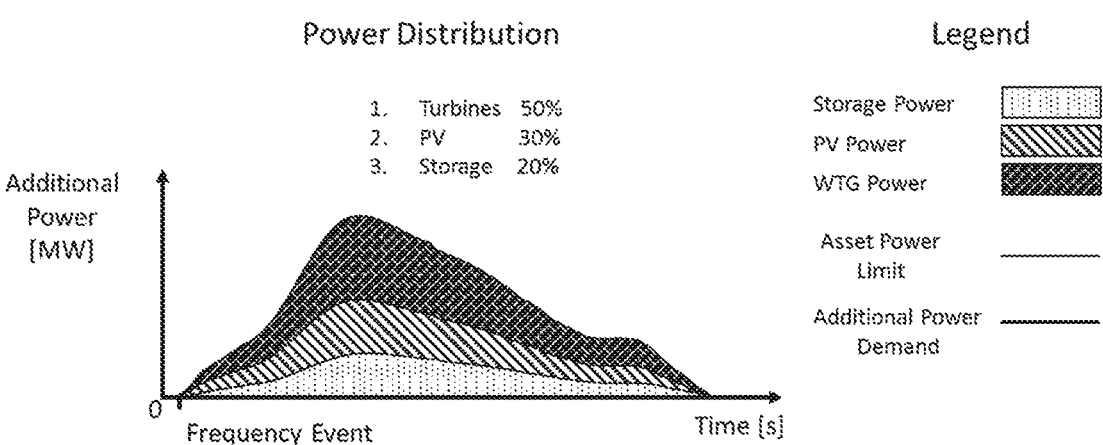
FIGS. 4 to 10 are charts illustrating the implementation of different configurations for determining the contribution of the generators of the hybrid power plant of FIG. 1 during the method of FIG. 3.

A first configuration type is shown in FIG. 4. In this configuration, the HPPC 34 implements a percentage split of the additional amount between the generator types or sub-plants. In other words, the HPPC 34 determines the additional amount and applies the percentage split to the additional amount to determine the contributions required from each type of generator. In the embodiment of FIG. 4, 50% of the additional amount of active power for frequency support is to be supplied by WTG spinning reserve, 30% of the additional amount is to be provided by PV reserve and the remaining 20% is to be provided by the battery energy storage system reserve. The overall demand for the period of the FFR is shown as the main curve in FIG. 4, with each segment according to the percentage split shown underneath.

These values are used by way of example only, and it will be appreciated that the percentage split may be changed and reconfigured within the HPPC 34 as desired or according to other criteria. For example, in some embodiments, the percentage split may be configured within the HPPC 34 at the time of installation and not capable of being changed. In other embodiments, the percentage split may be configurable by an operator via an operator interface.

Figure 5:
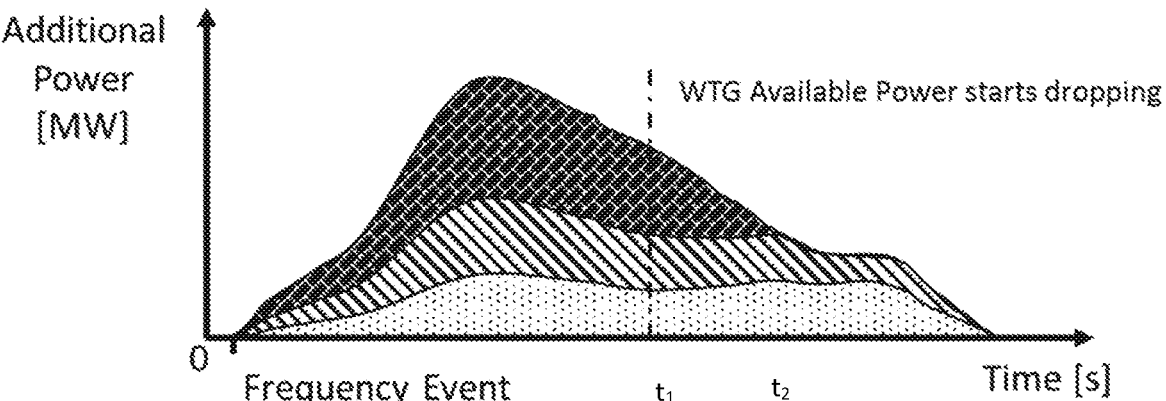

In some embodiments, the percentage split may be responsive to data received by the HPPC 34 relating to the operation of the grid 26 and/or the HPP 12 and its generators 20, 22, 24. A particular example of this is illustrated in FIG. 5. In this example, the power available as part of the reserve of the WTGs 22 fluctuates due to changes in wind speed. Accordingly, the change in power available to be supplied by the WTGs 22 is communicated to the HPPC 34. If it is determined, during comparison between calculated contribution for the WTGs 22 and the available power from the WTGs 22, that the WTGs 22 cannot supply their contribution, the HPPC 34 may determine a deficiency in available active power capacity and temporarily adjust the percentage split to increase the contribution of the PVs 20 and battery energy storage system 24 to account for the deficiency.

As shown in FIG. 5, at time $t_1$ the available power begins from the WTGs 22 begins to drop. At each time point after this during which the HPPC 34 is calculating the split, the WTG contribution is reduced. When the WTGs 22 cannot supply additional power at all, as can be seen at point $t_2$, the PVs 20 and battery storage 24 provide the additional amount of active power. The split between these two remaining assets is calculated according to a weighted average that splits the deficiency according to their original ratio. In the example where the turbine was supplying 50%, the PV 30% and the battery storage 20%, the reduction of the turbine percentage to 0% will result in the 50% being split between the PV and the battery storage according to their original ratio, so that the PV contribution increases by 30% to 60% and the battery storage contribution to 40%.

In this example, the HPPC 34 may also receive data from the PVs and battery storage systems to ensure that the redistribution of the additional amount does not exceed the available capacities of these two generation systems. If the capacity of a sub-plant is exceeded, the HPPC 34 may request the full capacity from that sub-plant and calculate the deficiency again, to determine further contribution to be provided by the remaining sub-plant or sub-plants.

As an alternative to the percentage split, the HPPC 34 implements a priority list or sequence of types of generator and/or sub-plants according to which the additional amount should be fulfilled. According to this configuration, the HPPC 34 determines an additional amount, and determines the contribution for the sub-plants or types of generators based on the sequence and capacity of available generators. Following the sequence, contributions are calculated to equal the maximum amount of the additional amount that the type of generator can supply until the cumulative total of the contributions equals the additional amount.

Figure 6:
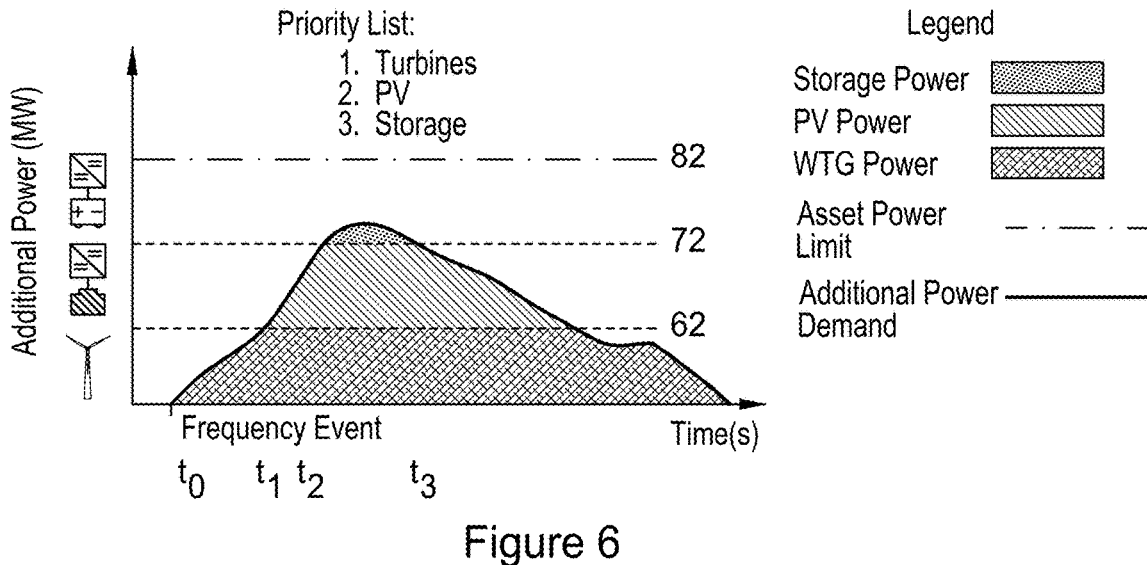

An example of the use of a priority sequence is shown in FIG. 6. In the example of FIG. 6, the reserve of the WTGs is first in the sequence, followed by the reserve of the PVs and finally the reserve of the battery storage system. The power limits/available capacity of each of the types of generator are shown by black lines labelled with reference signs 62, 72, 82 for WTGs, PV, and battery storage respectively.

As can be seen, at first, in the region, between $t_0$ and $t_1$, the additional amount s less than the available capacity of the first type of generator in the sequence, the WTGs. Therefore the reserve of the WTGs is used to fulfil the entirety of the additional amount. As the additional amount is less than the capacity for this type of generator, the request sent to the WTGs is equal to the additional amount.

Subsequently, between $t_1$ and $t_2$ the additional amount exceeds the capacity of the WTGs. During this period, the HPPC 34 determines that the WTGs alone cannot fulfil the additional amount, and so requests the maximum contribution from the WTGs, which is equal to the available reserve capacity. The HPPC 34 subsequently determines if the PV can supply the remainder of the additional amount after accounting for the available capacity supplied by the WTGs, lithe remainder is less than the capacity of the PVs, the remainder is requested, as seen between $t_1$ and $t_2$. If it is more, the HPPC requests maximum contribution from the PVs, and moves on to the next in the sequence, which in this case is the battery energy storage system, determining at each step in the process whether the remainder of the additional amount can be fulfilled by the next in the sequence. Between $t_2$ and $t_3$, the cumulative capacities of the WTG and PV generators are exceeded, so battery energy storage reserve is used next. The storage reserve can provide the remainder of the additional amount, the remainder being the additional amount minus the reserve capacities of the generators earlier in the sequence, the PV generators and WTGs. The process continues like this until the end of the fast frequency response.

If, during the response, the capacity of one of the types of generators increases or decreases, the contributions are redistributed accordingly, but still utilising the sequence. This phenomenon is described and shown in FIG. 10 below.

Although the sequence is indicated here as being strictly one generator at a time, the sequence may include multiple types of generators or sub-plants to be used at once. For example, in a sequence according to an embodiment, WTGs and PV may be indicated first in the sequence with the battery energy storage system after. In this embodiment, the HPPC 34 splits the additional amount between the WTGs and PV initially until both their reserve capacities are fully utilised, before utilising the reserve of the battery energy storage system.

In addition to the percentage split and sequence embodiments, there are a number of additional features that can be utilised to improve the fast frequency response of hybrid power plants.

Figure 7:
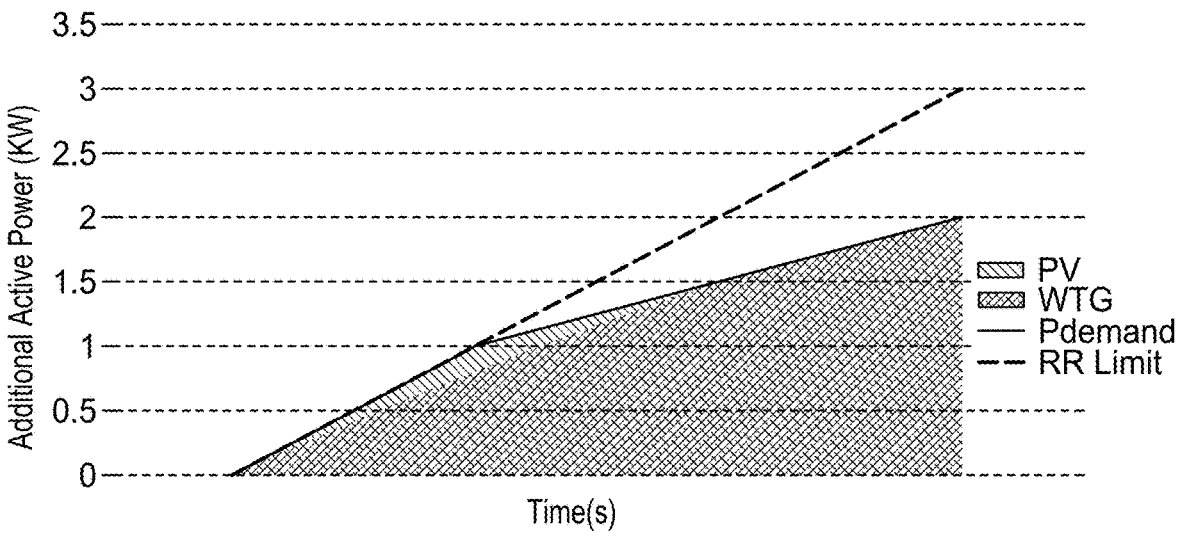

FIG. 6 illustrates the use of more than one type of generator to initially meet the demand for active power. This is useful where the ramp rate of one type of generator may not be high enough to initially meet demand. In FIG. 7, the frequency response begins at to. The sequence configuration is being used in the order WTGs, PV, battery. Initially, as can be seen between $t_0$ and $t_1$, the WTG ramp rate is too low to meet the demand for active power. To meet the demand, therefore, active power is also supplied by the PV. The contribution from the PV is maintained until the WTG ramps to a point where the demand is met only by the WTGs or the capacity of the WTGs is requested.

When applied in percentage split mode, the slower ramp rate of the WTGs compared to PV and battery storage may be compensated for by briefly shifting the percentage split to account for this. This principle is the same as applied in relation to FIG. 5, in which the available capacity is lower than the percentage requested by the PPC.

Of course, it will be appreciated that the system may be configured to incorporate a ramp rate limit corresponding a maximum ramp rate at which additional active power may be demanded.

As already described, some renewable energy generators, particularly WTGs and occasionally PV generators, are configured to provided a so-called 'over-boost' mechanism. Where over-boost is possible and permitted, it may be utilised as an additional 'type' of reserve, separate to the original reserve. Accordingly, for the three sub-plants of FIG. 1, there may be four, or even possibly five, sources of additional active power for FFR.

In general, over-boost is only used as a last-resort, although if desired it can be used in the same way as any of the reserves already described. However, its short term nature lends itself to temporarily boosting active power output to meet high additional amount requests.

Figure 8:
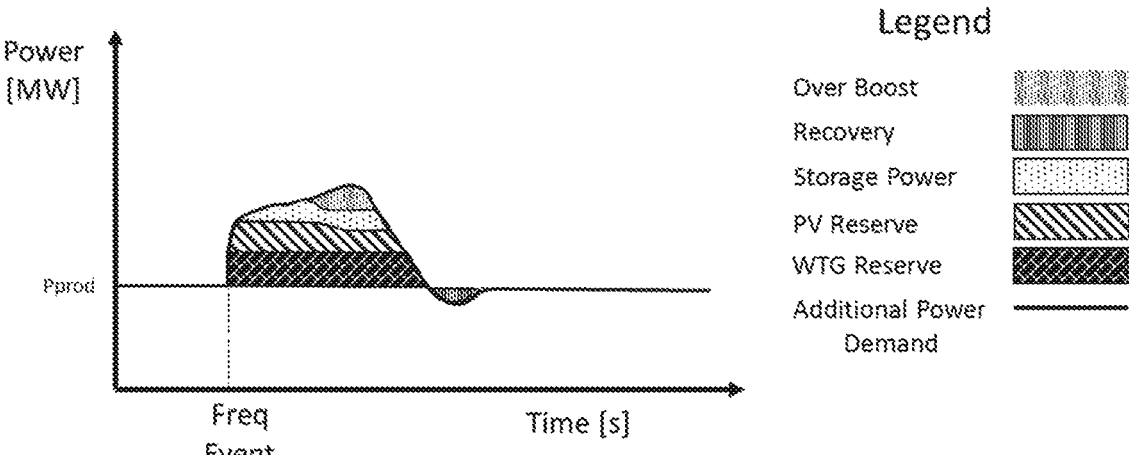

An example of this is shown in FIG. 8. In FIG. 8, the sequence configuration is used, with the sequence reading: WTG reserve, PV, Battery, WTG over-boost. Accordingly, as shown in FIG. 8, initially, when the frequency event occurs, the maximum WTG and PV contributions are requested and the remainder of the additional amount is contributed by the battery storage. At time $t_{overboost}$ the additional amount required increases to a level higher than the storage system can provide, i.e. the storage system's capacity is exceeded. At this point, the first three types of generator in the sequence are providing their maximum contribution by providing their entire available reserve capacities. As a result, the sequence indicates that over-boost is the next generation type to meet the demand. Thus, after $t_{overboost}$, at $t_x$ the WTG over-boost mechanism is utilised for as long as possible, or until its contribution is no longer required.

As also described above, over-boost requires a period of subsequent recovery. A period of recovery is shown in FIG. 8 after the additional active power level has returned to zero. The recovery results in a dip in active power levels.

Figure 9:
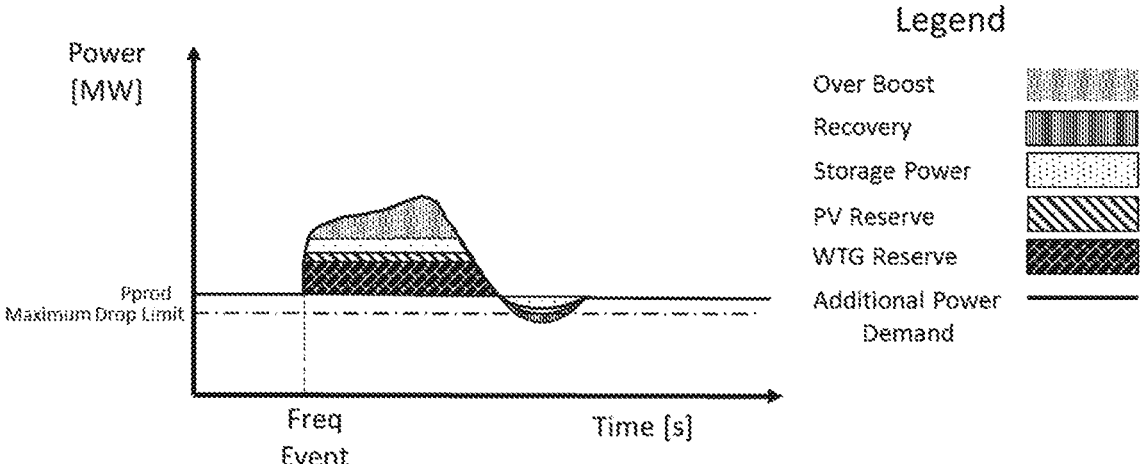

In some embodiments, such as the embodiment of FIG. 9, the over-boost recovery may be mitigated using one or more of the reserves of other generators within the HPP 12. For example, as shown in FIG. 9, battery storage reserves may be utilised to supplement the active power levels during the recovery period. In the embodiment shown the battery energy storage system is used both during the FFR and during the recovery after over-boost. However, in others, the battery energy storage may be specifically reserved for use during over-boost recovery only. While the battery energy storage system is here described as being used in compensating for the recovery period, it will be appreciated that any type of generator or sub-plant may be used for this purpose.

The provision of the present embodiment may enable participation in frequency control ancillary service (FCAS) markets, such as the Contingency FCAS market in Australia and the ancillary services market in Ireland. These markets require sustained provision of additional active power for a predetermined time period, which can be in the order of a few seconds, tens of seconds, or hundreds of seconds. For example, both the Irish and Australian markets have a set time frame of five minutes or 300 seconds, among others. Operating a HPP 12 according to embodiments described herein may increase the time that the plant is able to provide ancillary services for, enabling the potential for operation and provision of additional active power for a sustained period of time, possibly up to and maybe in excess of 300 seconds. An example of this is shown in FIG. 10.

Figure 10:
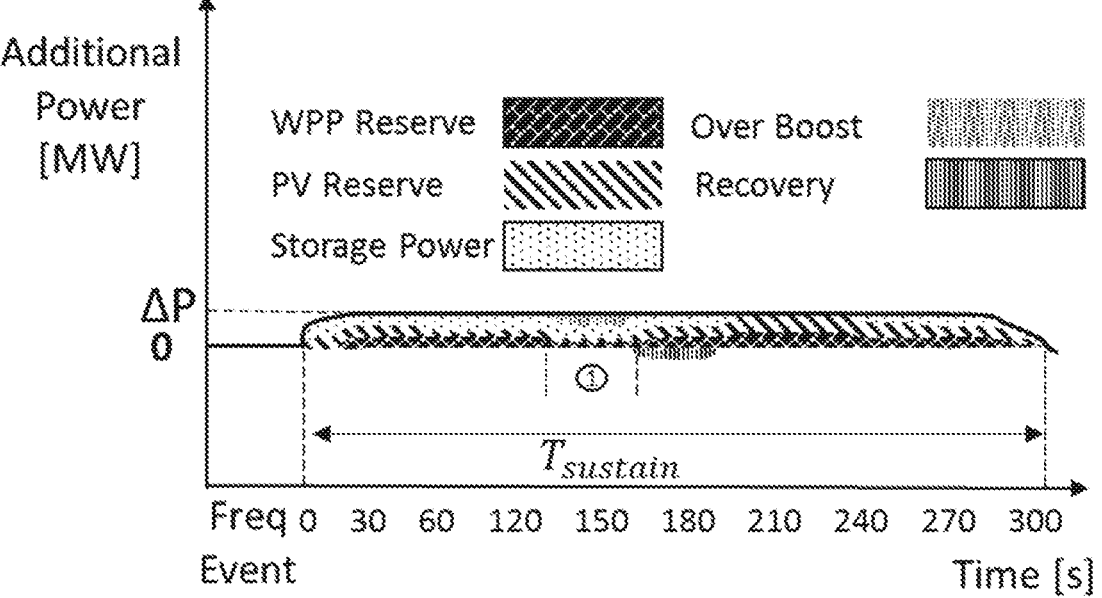

In FIG. 10, it can be seen that the HPP 12 is being operated in priority mode. When the frequency event occurs at 0 seconds, there is no capacity for WTG reserve support, so PV reserve power is used, with storage active power being utilised to make up the rest of the additional active power amount. Once wind power reserve is available at approximately 30 seconds, the HPPC 34 acts to reduce the amount of storage power used from the battery energy storage system and increases the requested active power from the WTGs. The variation in PV and WTGs available capacity continues to vary along the entire 300 second window. For example, at approximately 200 seconds, the capacity of the WTGs and PVs is high enough that the storage system is not utilised for a period of 40 seconds.

At approximately 130 seconds until 160 seconds, which is labelled with a number (1) in a circle in FIG. 10, the PV and WTG capacity is low and the storage reserve for FFR is not sufficient to fulfil the full capacity. According to the priority sequence therefore, the HPPC 34 acts to implement over-boost capability of the WTGs to fulfil the deficiency. After (1), the recovery period of the turbines takes place, being compensated by the battery storage reserve.

While the above description is provided in relation to under-frequency events, it will be appreciated that frequency may also rise above the nominal frequency in an over-frequency event. The above techniques may also be applied to over-frequency events such that configurations including the percentage split and priority sequence are applied to how the active power from the types of generator is curtailed. As will be appreciated, this will be managed with respect to a minimum viable output of the generators, particularly for WTGs.

It will be appreciated that various changes and modifications can be made to the present invention without departing from the scope of the present application.

The invention claimed is:

1. A method of controlling a hybrid power plant connected to a power network, the hybrid power plant comprising at least two types of renewable energy generator having an active power reserve for supplying additional active power to the power network, the method comprising, during a frequency event detected on the power network:

determining, based at least in part, on the frequency event, an additional amount of active power for the hybrid power plant to provide to the power network to provide a frequency response;

calculating, based on a priority sequence configuration and the active power reserve of the at least two types of renewable energy generator, a contribution from each of the at least two types of renewable energy generator for supplying the additional amount of active power, wherein the priority sequence configuration comprises a sequence in which the at least two types of renewable energy generator should cumulatively provide a maximum-possible contribution to the additional amount; and generating and dispatching active power requests to the generators for supplying the additional amount according to the calculated contributions, wherein at least one type of the at least two types of renewable energy generator is configured to contribute active power from a reserve and using an over-boost mechanism, and wherein the sequence includes an entry for the reserve and an entry for the over-boost, the entry for the reserve being earlier in the sequence than the entry for the over-boost, and wherein the over-boost mechanism is a capability of the at least one type to supply active power above a rated value.

2. The method of claim 1, wherein calculating the contribution comprises comparing, in an order of types of generator of the priority sequence, a remainder of the additional amount with an available capacity of reserve of the generators, and wherein, if the remainder exceeds the available capacity of the generators, then the contribution is set to equal to the available capacity, and wherein, if the available capacity exceeds the remainder, then the contribution is set to equal to the remainder.

3. The method of claim 1, comprising, during a period of post-over-boost recovery during which the active power contribution of one type of generator drops below a nominal level, compensating for at least part of the drop using the reserve of a different type of generator.

4. The method of claim 3, wherein the reserve of the type of generators providing compensation is reserved for compensation only.

5. The method of claim 3, wherein the reserve of the type of generators is divided into reserve for use in providing contribution to the additional amount and reserve for compensation.

6. The method of claim 3, wherein the type of generators providing compensation comprises battery energy storage.

7. The method of claim 1, wherein calculating the contribution comprises comparing a demand ramp rate with a ramp rate limit for a type of generator in the sequence, and, if the demand ramp rate exceeds the ramp rate limit, calculating a contribution from the next type of generator in the sequence to meet the demand ramp rate.

8. The method of claim 1, wherein the hybrid power plant comprises at least two types of generator selected from a list comprising: wind turbine generators; a battery energy storage system; and/or photovoltaic generators.

9. The method of claim 8, wherein the hybrid power plant comprises wind turbine generators, a battery energy storage system, and photovoltaic generators, and wherein the wind turbine generators and photovoltaic generators are before the battery energy storage system in the priority sequence.

10. The method of claim 8, wherein a slave wind power plant is provided as a separate type of renewable energy generator to the wind turbine generators of the hybrid power plant.

11. A method of controlling a hybrid power plant connected to a power network, the hybrid power plant comprising at least two types of renewable energy generator having an active power reserve for supplying additional active power to the power network, the method comprising, during a frequency event detected on the power network:

determining an additional amount of active power to be provided by the hybrid power plant to the power network to provide a frequency response;

calculating, based on a preset configuration and the active power reserve of the generators, a contribution from each of the at least two types of generator for supplying the additional amount of active power, wherein the preset configuration comprises a percentage split of the additional amount between the at least two types of generators;

generating and dispatching active power requests to the generators for supplying the additional amount according to the calculated contributions; and comprising comparing, for each type of generator, the calculated contribution with an available capacity of reserve of the generators, and, if the calculated contribution exceeds the available capacity, adjusting the percentage split to account for the exceedance; wherein at least one type of generator is configured to contribute active power from a reserve and using an over-boost mechanism, and wherein the percentage split includes a percentage for the reserve
and a percentage for the over-boost.

\* \* \* \* \*